(12) United States Patent
Miyatake

(10) Patent No.: US 9,250,440 B2
(45) Date of Patent: Feb. 2, 2016

(54) OPTICAL SCANNING DEVICE, IMAGE FORMING APPARATUS AND OPTICAL SCANNING METHOD

(71) Applicant: Naoki Miyatake, Kanagawa (JP)

(72) Inventor: Naoki Miyatake, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 479 days.

(21) Appl. No.: 13/705,378

(22) Filed: Dec. 5, 2012

(65) Prior Publication Data
US 2013/0147895 A1 Jun. 13, 2013

(30) Foreign Application Priority Data
Dec. 13, 2011 (JP) ................................. 2011-271938

(51) Int. Cl.
| | |
|---|---|
| *G02B 26/12* | (2006.01) |
| *B41J 2/44* | (2006.01) |
| *B41J 2/47* | (2006.01) |
| *G03G 15/04* | (2006.01) |
| *G03G 15/01* | (2006.01) |
| *G03G 15/043* | (2006.01) |

(52) U.S. Cl.
CPC ............. *G02B 26/125* (2013.01); *B41J 2/442* (2013.01); *B41J 2/473* (2013.01); *G02B 26/129* (2013.01); *G03G 15/011* (2013.01); *G03G 15/04036* (2013.01); *G03G 15/0435* (2013.01); *G03G 2215/0119* (2013.01); *G03G 2215/0158* (2013.01)

(58) Field of Classification Search
CPC ............. G02B 26/0816; G02B 26/123; G02B 26/125; G02B 26/129; B41J 2/442
See application file for complete search history.

(56) References Cited

U.S. PATENT DOCUMENTS

| | | | |
|---|---|---|---|
| 5,680,254 A | 10/1997 | Ueda et al. | |
| 5,861,978 A | 1/1999 | Kamikubo | |
| 2001/0055139 A1* | 12/2001 | Hayashi | ........................ 359/196 |

(Continued)

FOREIGN PATENT DOCUMENTS

| | | |
|---|---|---|
| JP | 63-49726 A | 3/1988 |
| JP | 08-334719 | 12/1996 |

(Continued)

OTHER PUBLICATIONS

Office Action issued Jun. 9, 2015 in Japanese Patent Application No. 2011-271938.

*Primary Examiner* — Kristal Feggins
*Assistant Examiner* — Kendrick Liu
(74) *Attorney, Agent, or Firm* — Oblon, McClelland, Maier & Neustadt, L.L.P.

(57) ABSTRACT

An optical scanning device includes a plurality of light sources configured to emit a plurality of light beams, respectively; an optical deflector having a deflection-reflection surface that deflects and reflects the light beams, each of the light beams being incident on the deflection-reflection surface at an oblique incident angle, the oblique incident angles of the light beams being different from one another; and a flat glass arranged to be tilted at a tilt angle with respect to the deflection-reflection surface in a sub-scanning direction, the light beams being incident on the deflection-reflection surface via the flat glass, the tilt angle being smaller than a largest one of the oblique incident angles of the light beams. The light beams deflected and reflected by the deflection-reflection surface are incident on a plurality of scanned surfaces via the flat glass, respectively.

15 Claims, 8 Drawing Sheets

(56) References Cited

U.S. PATENT DOCUMENTS

| | | | |
|---|---|---|---|
| 2002/0001118 A1 | 1/2002 | Nakajima et al. | |
| 2002/0149666 A1 | 10/2002 | Amada et al. | |
| 2003/0133175 A1* | 7/2003 | Suzuki et al. | 359/204 |
| 2003/0156310 A1 | 8/2003 | Suzuki et al. | |
| 2003/0206322 A1 | 11/2003 | Atsuumi et al. | |
| 2003/0214693 A1 | 11/2003 | Hayashi et al. | |
| 2004/0001241 A1 | 1/2004 | Hayashi et al. | |
| 2004/0165240 A1 | 8/2004 | Suzuki et al. | |
| 2004/0184127 A1 | 9/2004 | Nakajima et al. | |
| 2004/0240000 A1 | 12/2004 | Miyatake et al. | |
| 2005/0093962 A1 | 5/2005 | Miyatake et al. | |
| 2005/0094234 A1 | 5/2005 | Miyatake et al. | |
| 2006/0203264 A1 | 9/2006 | Miyatake | |
| 2006/0291026 A1 | 12/2006 | Miyatake | |
| 2007/0002417 A1 | 1/2007 | Hirakawa et al. | |
| 2007/0030538 A1 | 2/2007 | Hirakawa et al. | |
| 2007/0215800 A1* | 9/2007 | Miyatake et al. | 250/234 |
| 2007/0216754 A1 | 9/2007 | Miyatake | |
| 2007/0297036 A1 | 12/2007 | Nakamura et al. | |
| 2008/0062491 A1 | 3/2008 | Nakamura et al. | |
| 2008/0068691 A1 | 3/2008 | Miyatake | |
| 2008/0180772 A1 | 7/2008 | Miyatake et al. | |
| 2008/0192319 A1 | 8/2008 | Miyatake et al. | |
| 2009/0073528 A1 | 3/2009 | Miyatake | |
| 2009/0073580 A1* | 3/2009 | Hayashi et al. | 359/811 |
| 2009/0168132 A1 | 7/2009 | Miyatake | |
| 2010/0091083 A1 | 4/2010 | Itami et al. | |
| 2011/0063704 A1 | 3/2011 | Miyatake | |
| 2011/0110687 A1 | 5/2011 | Miyatake et al. | |
| 2012/0177409 A1 | 7/2012 | Arai et al. | |
| 2012/0236380 A1 | 9/2012 | Miyatake et al. | |

FOREIGN PATENT DOCUMENTS

| | | |
|---|---|---|
| JP | 08-334720 | 12/1996 |
| JP | 2001-290095 A | 10/2001 |
| JP | 2003-005144 | 1/2003 |
| JP | 2003-131152 A | 5/2003 |
| JP | 2006-133517 | 5/2006 |
| JP | 2007-41511 A | 2/2007 |
| JP | 2007-248565 A | 9/2007 |
| JP | 2009-69672 A | 4/2009 |

* cited by examiner

OPTICAL SCANNING DEVICE, IMAGE FORMING APPARATUS AND OPTICAL SCANNING METHOD

CROSS-REFERENCE TO RELATED APPLICATION

The present application claims priority to and incorporates by reference the entire contents of Japanese Patent Application No. 2011-271938 filed in Japan on Dec. 13, 2011.

BACKGROUND OF THE INVENTION

1. Field of the Invention

The present invention relates to an optical scanning device, an image forming apparatus including the optical scanning device, and an optical scanning method.

2. Description of the Related Art

Electrophotographic image forming apparatuses used in laser printers, laser plotters, digital copiers, plain-paper facsimiles, and multifunction peripherals have recently become increasingly faster and capable of forming color images. Image forming apparatuses of a tandem configuration provided with a plurality of (typically, four) photosensitive elements which are image carriers have come into wide use. In such a tandem image forming apparatus, for example, four photosensitive elements are arranged side by side along a conveying belt (or an intermediate transfer belt on which toner images are temporarily carried) that conveys a recording material. The tandem image forming apparatus forms a color image as follows. Electric chargers electrostatically charge the photosensitive elements. Thereafter, writing units form latent image on the photosensitive elements. Developing units develop the latent images on the photosensitive elements with respective developing materials (yellow, magenta, cyan, and black toners, for example). These developed images of the respective colors are sequentially transferred onto the recording material (or the intermediate transfer belt) conveyed by the conveying belt to be overlaid on one another, thereby forming a color image.

As another than the tandem configuration, what is referred to as a one-drum-intermediate-transfer configuration is adopted by some image forming apparatuses. This type of image forming apparatus develops toner images of respective colors one by one on a single photosensitive element, transfers the toner images onto an intermediate transfer member one by one to overlay the images on one another to form a color image on the intermediate transfer member, and thereafter transfers the images onto a recording material at a time. This configuration requires rotating the photosensitive element four times for each sheet of image formation. Accordingly, this configuration is inferior in productivity in color image formation to the tandem configuration.

As described above, tandem image forming apparatuses can form color images at higher speeds than the one-drum-intermediate-transfer image forming apparatuses and therefore can increase productivity in color image formation. However, in the tandem image forming apparatus, an optical scanning device is used as a writing unit that performs optical writing onto the plurality of photosensitive elements. Accordingly, the optical scanning device is undesirably required to include a plurality of light sources (for instance, an image forming apparatus including four photosensitive elements generally requires four light sources). As a result, an increase in the number of components, misregistration due to differences between wavelengths of the plurality of light sources, an increase in production cost, and the like problems arise.

Some type of tandem image forming apparatuses includes an optical scanning device that deflects light flux, or light beams, emitted from a plurality of light source devices associated with a plurality of photosensitive elements using a single deflector so that exposure of the photosensitive elements is performed simultaneously using a plurality of scanning-image-forming optical systems associated with the photosensitive elements, thereby forming latent images.

When such an optical scanning device is employed, a configuration what is referred to as an oblique-incidence optical system is typically employed for cost reduction. For example, a technique that causes light beams to be incident on a deflection-reflection surface of a deflector obliquely with respect to the sub-scanning direction is disclosed in Japanese Patent Application Laid-open No. 2003-005114. In this incidence optical system, each of the plurality of light beams is deflected and reflected by the deflection-reflection surface. Thereafter, the plurality of light beams are separated and guided onto corresponding scanned surfaces (photosensitive element surfaces) by a turning mirror or the like. Angles (angles of incidence on the optical deflector) of the plurality of light beams with respect to the sub-scanning direction are set to angles that allow the turning mirror or optical elements associated with the plurality of light beams to separate the light beams from one another.

In other words, employing the oblique-incidence optical system makes it possible to achieve intervals, at which the turning mirror can separate the light beams from one another, between the light beams in the sub-scanning direction without upsizing an optical deflector. This leads to a less-expensive optical scanning device. The upsizing can result from, for example, increasing the thickness of a polygon mirror of the optical deflector or adopting a polygon mirror that is multi-layered with respect to the sub-scanning direction of the light beams. When a polygon mirror is used as the optical deflector, large energy that would otherwise be required for high-speed spinning becomes unnecessary, and wind noise caused by the high-speed spinning can be reduced.

In an image forming apparatus that employs the oblique-incidence optical system, a flat glass is typically arranged on optical paths of the plurality of light beams at a position near the optical deflector for the sake of reducing wind noise caused by high-speed spinning of the optical deflector, reducing transfer of heat that is generated at a motion section of the optical deflector, preventing mirror surfaces of the optical deflector from being smudged, and the like.

Put another way, the plurality of light beams deflected and reflected by the optical deflector enter the scanning optical system via the flat glass. The flat glass is arranged obliquely with respect to the sub-scanning direction with reference to the plane of the normal of the deflection-reflection surface of the optical deflector. Accordingly, when the flat glass is tilted in the sub-scanning direction, some of the light beams does not return to the optical deflector, but the other of the light beams returns to be incident on the optical deflector again. In this case, there arises a problem that the light beam incident on the optical deflector again (referred to as stray light) reaches a scanned surface (photosensitive element surface), thereby degrading image quality.

Meanwhile, stray light is, contrasted with a light beam (writing light) that scans a scanned surface, unnecessary light resulting from reflection from an optical element or the like on an optical path of the light beam. For example, a light beam resulting from reflection from the flat glass is stray light.

A technique of arranging a flat glass parallel to a deflection-reflection surface of an optical deflector in an oblique-incidence optical system is disclosed in Japanese Patent Application Laid-open No. H08-334719. This technique is effective as a countermeasure against stray light in an optical system including only one scanned surface. However, this technique cannot prevent generation of stray light nor reduce an amount of stray light reaching a scanned surface when this technique is applied to an optical scanning device (or an image forming apparatus) that includes scanned surfaces to be scanned with a plurality of light beams and causes the plurality of scanning light beams to be incident on a same deflection-reflection surface of an optical deflector obliquely from opposite sides with reference to the plane of the normal of the deflection-reflection surface.

A technique related to a flat glass arranged upstream of incidence of a light beam on an optical deflector is disclosed in Japanese Patent Application Laid-open No. H08-334720. This technique causes the flat glass to tilt in a direction that causes a light beam that is reflected by the flat glass before incidence on the optical deflector and a light beam that is reflected from the optical deflector to deviate from each other. However, because the plurality of light beams are obliquely incident on a same deflection-reflection surface of the optical deflector from opposite sides with reference to the plane of the normal of the deflection-reflection surface, this technique cannot prevent generation of stray light from every light beam nor reduce an amount of stray light reaching a scanned surface.

Therefore, there is a need for an optical scanning device and an optical scanning method capable of preventing generation of stray light or reducing an amount of stray light reaching a scanned surface and an image forming apparatus including the optical scanning device.

SUMMARY OF THE INVENTION

It is an object of the present invention to at least partially solve the problems in the conventional technology.

According to an embodiment, there is provided an optical scanning device that includes a plurality of light sources configured to emit a plurality of light beams, respectively; an optical deflector having a deflection-reflection surface that deflects and reflects the light beams, each of the light beams being incident on the deflection-reflection surface at an oblique incident angle, the oblique incident angles of the light beams being different from one another; and a flat glass arranged to be tilted at a tilt angle with respect to the deflection-reflection surface in a sub-scanning direction, the light beams being incident on the deflection-reflection surface via the flat glass, the tilt angle being smaller than a largest one of the oblique incident angles of the light beams. The light beams deflected and reflected by the deflection-reflection surface are incident on a plurality of scanned surfaces via the flat glass, respectively.

According to another embodiment, there is provided an image forming apparatus that includes an image carrier; and an optical writing device configured to perform optical writing on the image carrier to form an electrostatic latent image on the image carrier by electrophotography. The optical writing device includes the optical scanning device according to the above embodiment.

According to still another embodiment, there is provided an optical scanning method that includes deflecting and reflecting a plurality of light beams by an optical deflector having a deflection-reflection surface so that each of the light beams is incident on the deflection-reflection surface at an oblique incident angle via a flat glass, the light beams being emitted from a plurality of light sources, respectively, the oblique incident angles of the light beams being different from one another. The flat glass is arranged to be tilted at a tilt angle with respect to the deflection-reflection surface in a sub-scanning direction, the tilt angle being smaller than a largest one of the oblique incident angles of the light beams. The light beams deflected and reflected by the deflection-reflection surface are incident on a plurality of scanned surfaces via the flat glass, respectively.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below with reference to the accompanying drawings.

Optical scanning devices and optical scanning method according to embodiments of the present invention are described below.

First Embodiment

Figure 1:
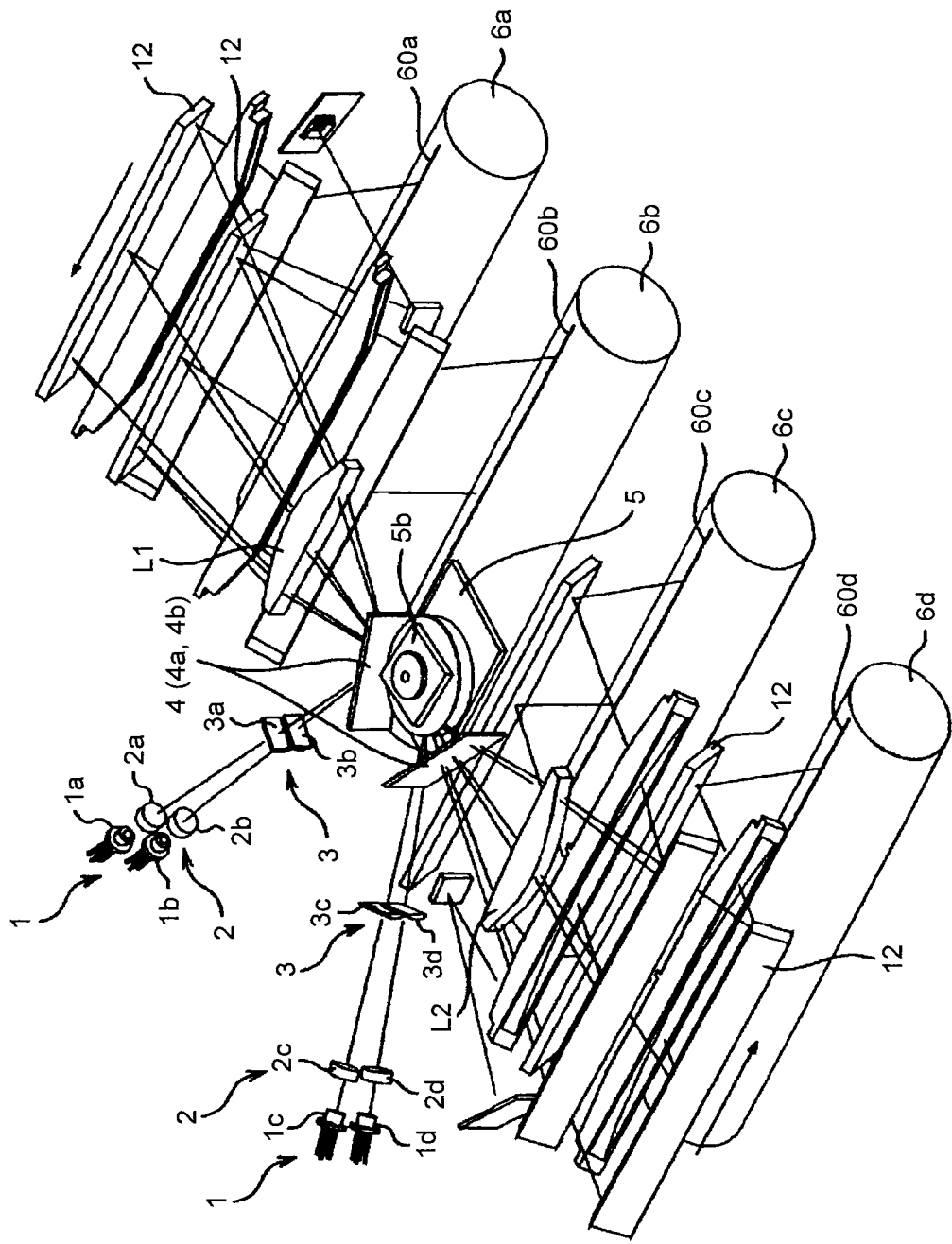
FIG. 1 is an optical arrangement diagram of an optical scanning device according to a first embodiment of the present invention.

FIG. 1 is a schematic perspective view illustrating an optical scanning device according to a first embodiment of the present invention. The optical scanning device includes one or more semiconductor laser arrays which are made up a plurality of light sources 1a, 1b, 1c, and 1d (any one of the light sources is referred to as the light source 1) as a plurality of light-emitting points; coupling lenses 2a, 2b, 2c, and 2d (any one of the coupling lenses is referred to as the coupling lens 2); cylindrical lenses 3a, 3b, 3c, and 3d (any one of the cylindrical lenses is referred to as the cylindrical lens 3); flat glasses 4a and 4b (any one of the flat glasses is referred to as the flat glass 4); an optical deflector 5 (which includes a polygon mirror having four deflection-reflection surfaces, for example); and photosensitive elements 6a, 6b, 6c, and 6d (any one of the photosensitive elements is referred to as the photosensitive element 6) include are scanned surfaces. The optical scanning device also includes scanning lenses L (L1 and L2) that cause light beams deflected by deflection-reflection surfaces 5 to converge on the scanned surfaces 60. The scanning lenses L are parts of a scanning optical system.

Figure 2:
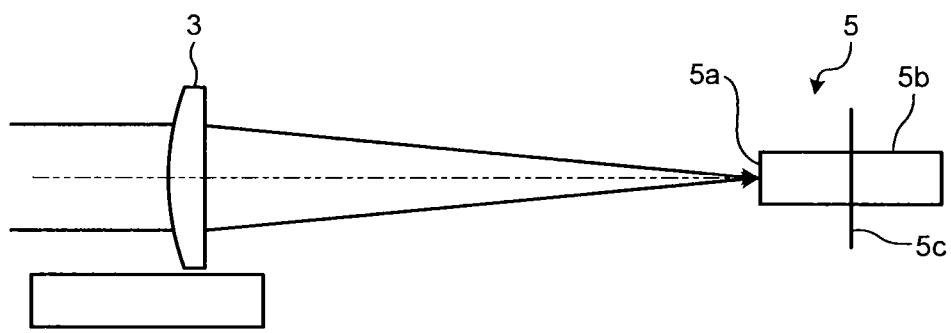
FIG. 2 is a schematic diagram illustrating light beams incident on a deflection-reflection surface of an optical deflector of the optical scanning device.
Figure 3:
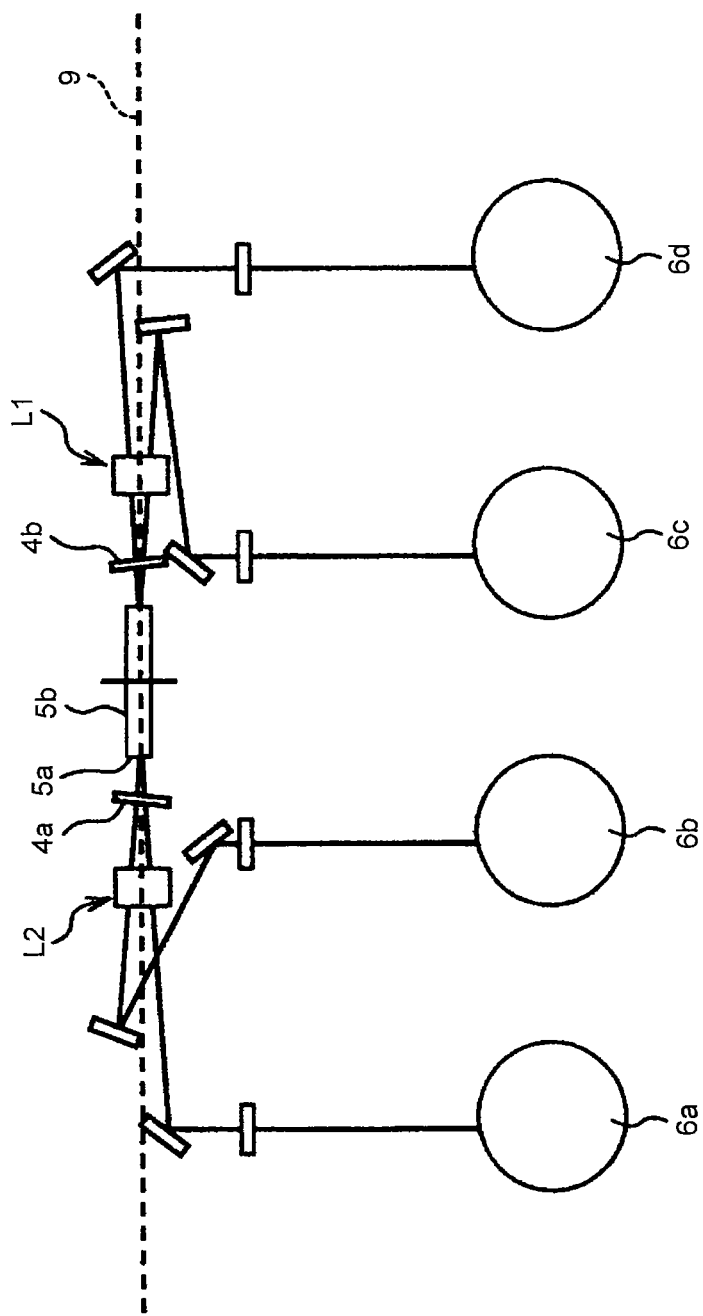
FIG. 3 is a schematic diagram illustrating optical paths of light beams deflected and reflected by the deflection-reflection surface.

In the optical scanning device, light beams emitted from the light sources 1 are incident on a same deflection-reflection surface 5a (see FIG. 2) of the optical deflector 5 obliquely from different directions with respect to the sub-scanning direction with reference to the plane of the normal 9 of the deflection-reflection surface 5a (see FIG. 3). The light beams enter and exit (are deflected and reflected by) the optical deflector 5 via the flat glass 4.

A diverging light beam emitted from the light source 1 of the semiconductor laser array is converted through the coupling lens 2 into a light beam of a form suitable for downstream optical system. The light beam can be converted through the corresponding coupling lens 2 into any one of a parallel light beam, a light beam of low divergence, and a light beam of low convergence, depending on the coupling lens 2.

The light beam exiting the coupling lens 2 is converged with respect to the sub-scanning direction through the corresponding cylindrical lens 3 and incident on the deflection-reflection surface 5a (FIG. 2) of the optical deflector 5.

The optical deflector 5 is described below. The optical deflector 5 includes a polygon mirror 5b that includes the deflection-reflection surfaces 5a. The polygon mirror 5b is spun at a constant angular velocity by a driving mechanism (not shown) clockwise or counterclockwise about a spin axis 5c. In the following, a direction in which light beams emitted from the light sources are deflected for scanning by the optical deflector 5 is referred to as the main-scanning direction, and the direction orthogonal to the main-scanning direction is referred to as the sub-scanning direction.

As illustrated in FIG. 2, flux of light (light beams) emitted from the light sources 1 of the semiconductor laser arrays is incident on the deflection-reflection surface 5a obliquely with reference to a plane orthogonal to the spin axis 5c. Accordingly, the light beams deflected and reflected by the deflection-reflection surface 5a also become tilted with reference to the deflection-reflection surface 5a. Such light beams tilted with reference to the plane orthogonal to the spin axis 5c can be obtained by arranging the light source 1, the corresponding coupling lens 2, and the corresponding cylindrical lenses 3 tilted with reference to the plane orthogonal to the spin axis 5c illustrated in FIG. 1 or, alternatively, using turning mirrors.

It is also possible to cause the light beams traveling toward the deflection-reflection surface 5a to be tilted as described above by shifting the optical axis of the cylindrical lens 3 in the sub-scanning direction. For example, when two light beams are horizontally incident on the cylindrical lens 3 at two positions equidistantly spaced from the optical axis of the cylindrical lens 3 in the sub-scanning direction, light beams exiting from the cylindrical lens 3 travel obliquely toward the focal point of the cylindrical lens 3.

The light beams deflected and reflected by the deflection-reflection surface 5a are deflected according to the constant angular velocity at which the deflection-reflection surface 5a spins, and pass through the scanning optical system to be converged on the scanned surfaces 60. The deflected light beams thus form light spots on the scanned surfaces 60 and optically scan the scanned surfaces 60.

The light beams emitted from the light sources 1 are incident on the deflection-reflection surface 5a via the corresponding flat glass 4. The light beams deflected and reflected by the deflection-reflection surface 5a enter a scanning optical system via the flat glass 4. In an actual configuration, the optical deflector 5 is surrounded by walls of an optical casing, and the light beams enter and exit (are deflected and reflected) the optical casing via the flat glass 4. The flat glasses 4 thus reduce wind noise caused by high-speed spinning of the optical deflector 5 and prevent a drop in reflectivity resulting from accretion of dusts and the like in the optical casing onto the deflection-reflection surface 5a. The flat glasses 4 are effective in reducing transfer of heat generated at a motion section of the optical deflector 5 or the like to the scanning lenses L and the like even when the optical deflector 5 is not placed in a space surrounded by walls. This effect is in particular important in recent years because the scanning lenses L are generally made of plastics, and degradation in optical characteristics resulting from deformation of the scanning lenses L that can occur when heat is transferred to the scanning lenses can be a large problem.

As illustrated in FIG. 1, the flat glasses 4 are tilted with respect to the main-scanning direction. Accordingly, the flat glasses 4 can be adjusted in such a manner that, even when some of light beams that are not incident on the optical deflector 5 yet are reflected by the flat glass 4 and become stray light, the stray light does not enter a scanning optical system.

The flat glasses 4 generate stray light by reflecting some of light beams deflected and reflected by the optical deflector 5. When the stray light is incident on the deflection-reflection surface 5a again and reaches the scanned surface 60, image quality degrades considerably. To prevent this, in the present embodiment, the flat glasses 4 are tilted with respect to the sub-scanning direction. Furthermore, the tilt angle is smaller than an oblique incident angle. The oblique incident angle is an angle between a light beam incident on the deflection-reflection surface and the normal to the deflection-reflection surface, or, in other words, an incident angle in the sub-scanning direction.

Figure 4:
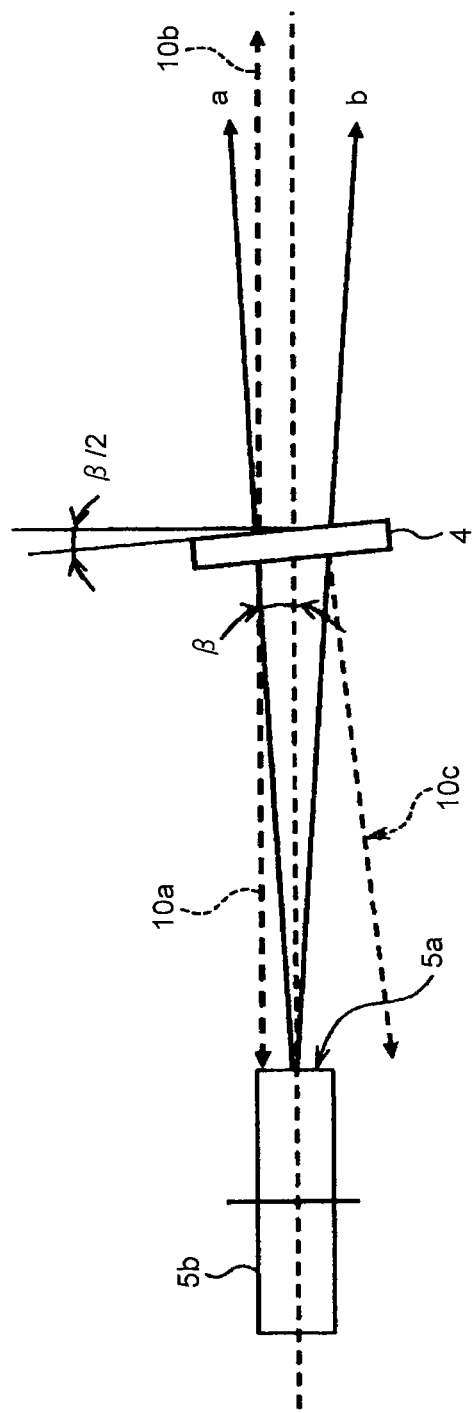
FIG. 4 is a schematic diagram illustrating a tilt angle of a flat glass of the optical scanning device in a cross section taken along the sub-scanning direction.

An example where, as illustrated in FIG. 4, the tilt angle of the flat glass 4 in the sub-scanning direction is one-half of the oblique incident angle is described below.

When the tilt angle of the flat glass 4 in the sub-scanning direction is $\beta/2$, or, more specifically, one-half of the oblique incident angle 13, the light beam reflected from the flat glass 4 is horizontally incident on the deflection-reflection surface 5a again as a light beam 10a. As a result, the light beam deflected and reflected by the optical deflector 5 again is horizontally incident on a scanning optical system. Meanwhile, light beams passing through the flat glass 4 and converged onto the scanned surfaces 60 are incident on the scanning optical system as light beams tilted in the sub-scanning direction as illustrated in FIG. 3.

In contrast, stray light 10b reflected from the flat glass 4 is horizontally incident on the scanning optical system and therefore travels over an optical path that is completely different from an optical path over which the light beam (writing light a and b) is converged onto the scanned surface 60. For example, although both light beams are incident on the scanning lens L1 (which is shared by a plurality of light beams in this example), the angle of the horizontally-incident light beam 10b as the stray light, largely differs in the sub-scanning direction from the angle of the light beam (writing light a and b) traveling toward the scanned surface 60. Accordingly, the stray light is incident neither on a turning mirror for guiding light beams onto a corresponding one of the scanned surfaces 60 nor the scanning lens L2 downstream, and the stray light does not reach the scanned surface 60. As a result, the degradation in image quality described above can be prevented.

As illustrated in FIG. 3, the scanning lens L1 is flat with respect to the sub-scanning direction. Alternatively, the scanning lens L1 may be configured to have a positive refractive power or a negative refractive power. More specifically, when the scanning lens L1 has a positive refractive power, an angle of stray light with respect to the sub-scanning direction is opposite in sign from that of the light beam traveling toward the scanned surface 60 for scanning. Accordingly, the stray light does not reach the scanned surface 60. When the scanning lens L1 has a negative refractive power, an angle of stray light with respect to the sub-scanning direction is same in sign as that of the light beam traveling toward the scanned surface 60 for scanning. However, the stray light is considerably less likely to reach the scanned surface 60 via a downstream optical element because of a difference between positions in the sub-scanning direction where the light beam and the stray light are incident on the scanning lens L1 and a difference between the angles in the sub-scanning direction of the light beam and the stray light.

When the tilt angle of the flat glass 4 is the same as the oblique incident angle, stray light is incident on another station (which denotes a printing unit having a scanned surface where the light beam (writing light) is not assumed to reach). In short, the stray light coincides with writing light of the other station. Accordingly, it is highly possible that the stray light is undesirably incident on the scanned surface 60 invariably, thereby degrading image quality. Tilting the flat glass 4 to an angle equal to or greater than the oblique incident angle is also undesirable in that it can result in degradation in optical characteristics such as an increase in scan line bow.

According to the first embodiment described above, the flat glass 4 is arranged to be tilted at a tilt angle in the sub-scanning direction of the scanned surface 60. The tilt angle is smaller than an incident angle which is largest among incident angles of the plurality of light beams. Accordingly, generation of stray light is prevented or stray light that reaches the scanned surface 60 can be reduced, and image quality can be increased.

Second Embodiment

An optical scanning device according to a second embodiment of the present invention is described below with an emphasis on points where the second embodiment differs from the first embodiment described above. More specifically, setting the tilt angle of the flat glass to approximately from one-half to three-quarters of the oblique incident angle of light beams is described below. Shielding a non-effective portion between optical effective portions in the sub-scanning direction from light is also described. Furthermore, finishing the non-effective portion in such a manner as to overcoat the portion with black paint is described below.

Figure 5:
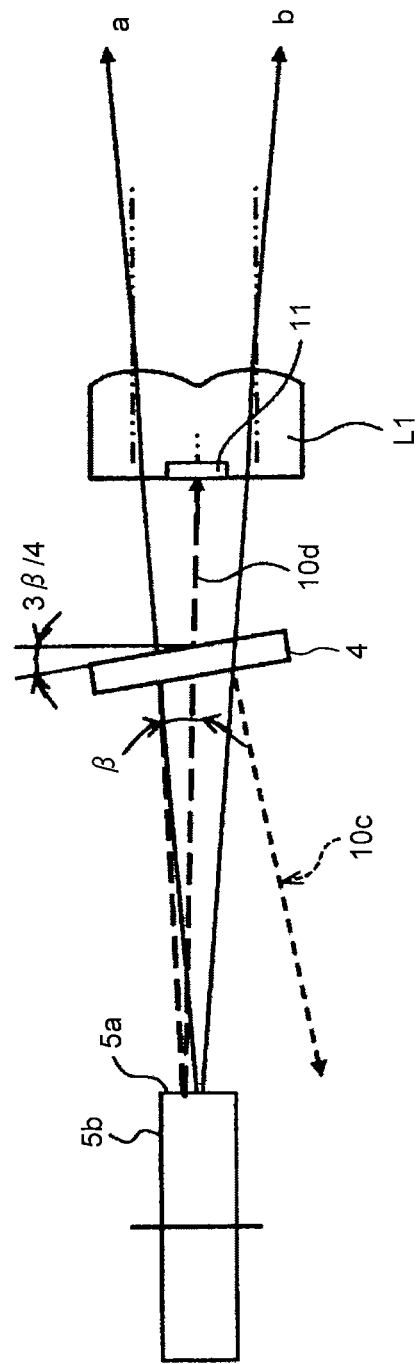
FIG. 5 is a schematic diagram illustrating an uneven surface provided on a scanning lens of the optical scanning device.

FIG. 5 is a schematic diagram illustrating the optical scanning device according to the second embodiment. The optical scanning device according to the second embodiment has a configuration in which a light beam emitted from at least one light source, deflected and reflected by the optical deflector 5, thereafter reflected from the flat glass 4, incident on the optical deflector 5 again, and reflected from the optical deflector 5 reaches a portion between optical elements corresponding to the plurality of scanned surfaces 60 in the sub-scanning direction. For example, the flat glass 4 illustrated in FIG. 5 is tilted three-quarters of the oblique incident angle β.

As illustrated in FIG. 5, when the tilt angle of the flat glass 4 is approximately three-quarters of the oblique incident angle, a portion of stray light resulting from reflection from the flat glass 4 is reflected from the deflection-reflection surface 5a of the optical deflector 5 again. Another portion of the stray light travels toward an approximate center between light beams, or writing light, that travel toward different two, which are aligned along the sub-scanning direction, of the scanned surfaces 60. Accordingly, the other portion does not reach the two scanned surfaces 60. For example, even in a case where the scanning lens L closest to the scanned surfaces 60 is shared by light beams traveling toward different two of the scanned surfaces 60 and a portion of stray light has transmitted through the scanning lens, the stray light is scattered by a downstream optical element provided for each of light beams.

In an oblique-incidence optical system, the scanning lens L closest to the optical scanning device is shared by light beams traveling toward different two or more of the scanned surfaces 60 in many cases. In this case, transmittance of an optical non-effective portion between optical effective portions of the scanning lens L (shared lens) for the light beams in the sub-scanning direction is desirably lower than transmittance of the optical effective portions.

As illustrated in FIG. 5, for example, a portion 10d where stray light is incident on a lens surface of the scanning lens L (shared lens) can be formed as an uneven surface 11 that causes diffuse reflection, thereby lowering the transmittance. This allows reducing an amount of stray light even when light reflected by the shared lens is incident on the deflection-reflection surface 5a again to become additional stray light. Even if the stray light reaches any one of the scanned surfaces 60, adverse effect of the stray light on an image can be lessened. Furthermore, an amount of the stray light resulting from reflection from the flat glass 4 is also reduced. Accordingly, even if the stray light reaches any one of the scanned surfaces 60, adverse effect of the stray light on an image can be lessened.

The optical non-effective portion between the optical effective portions in the sub-scanning direction can be light-shielded. Generation of stray light can be minimized by finishing the non-effective portion in such a manner as to overcoat the portion with black paint (to further reduce light reflectively), for example.

Examples in which the tilt angle of the flat glass 4 is set to one-half or three-quarters of the oblique incident angle β have been described. The tilt angle of the flat glass 4 is preferably smaller than the oblique incident angle β, and more preferably in a range from approximately one-half to three-quarters of the oblique incident angle β.

Figure 6:
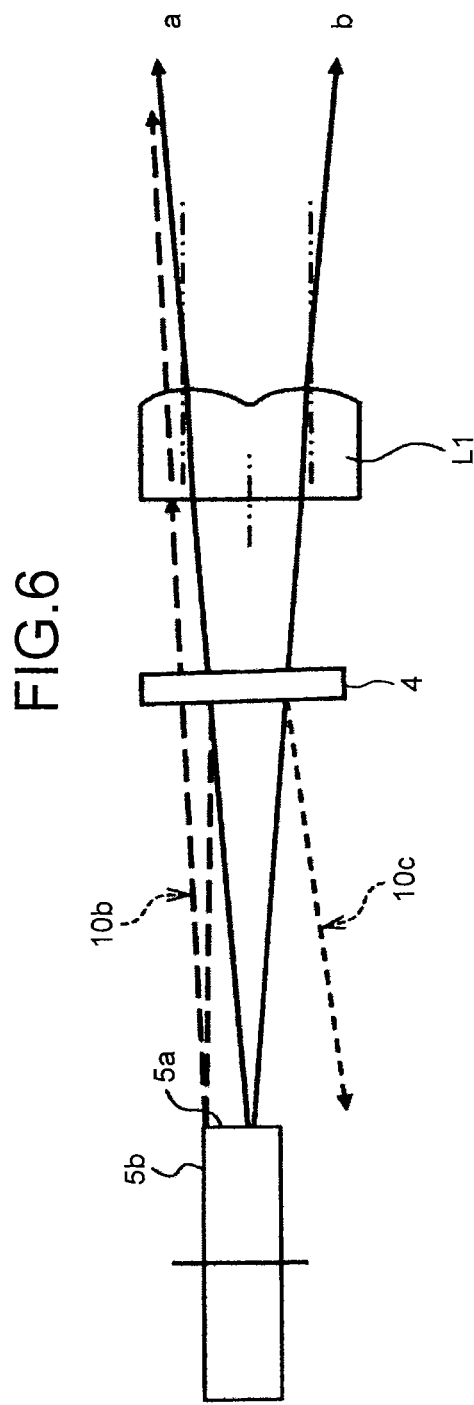
FIG. 6 is a schematic diagram illustrating an example of stray light resulting from reflection off the flat glass.

When the tilt angle of the flat glass 4 is smaller than one-half of the oblique incident angle β, an angle of a portion 10b of stray light and an angle of the writing light a of some light beams become substantially equal in the sub-scanning direction as illustrated in FIG. 6. This stray light highly possibly reaches the scanned surface. As for the remaining light beams, stray light deviates from writing light by small degrees, and therefore the stray light highly possibly reaches the scanned surface.

Figure 7:
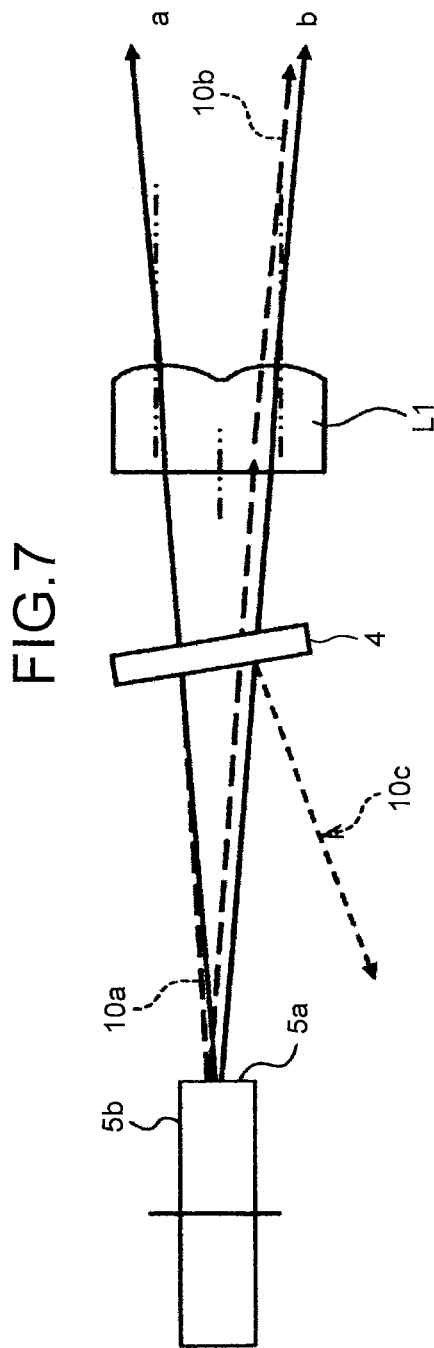
FIG. 7 is a schematic diagram illustrating an example in which writing light reflected from the deflection-reflection surface and stray light are substantially parallel.

As illustrated in FIG. 7, when the tilt angle of the flat glass 4 is equal to or greater than three-quarters of the oblique incident angle β, an angle of stray light 10b in the sub-scanning direction and that of the writing light b traveling toward the other scanned surface 60 coincide (i.e., the writing light and the stray light travel substantially parallel to each other). Accordingly, the stray light is likely to reach the other scanned surface 60. When the tilt angle of the flat glass 4 is greater than three-quarters of the oblique incident angle β and close to the oblique incident angle β, stray light is highly possibly incident on another one of the scanned surfaces 60 than the scanned surface 60 on which writing light is incident for scanning.

As described above, when the tilt angle of the flat glass 4 is equal to or greater than one-half of the oblique incident angle β (in a case where stray light is horizontal), the differential between an angle of stray light and that of writing light in the sub-scanning direction is relatively large. When the tilt angle of the flat glass 4 is approximately three-quarters of the oblique incident angle β, neither scattering near the center of the shared lens nor incidence on a turning mirror occurs. Accordingly, such a condition makes stray light less likely to reach a scanned surface.

According to the second embodiment described above, the tilt angle of the flat glass is set to approximately from one-half to three-quarters of the oblique incident angle of light beams. Furthermore, the non-effective portion between the optical effective portions in the sub-scanning direction is light-shielded and finished in such a manner as to be overcoated with black paint. As a result, generation of stray light can be minimized, and image quality can be increased.

Third Embodiment

An optical scanning device according to a third embodiment of the present invention is described below with an emphasis on points where the third embodiment differs from the first and second embodiments described above. More specifically, setting a tilt direction of the flat glass 4 so as to cause the flat glass 4 to face an installation surface of the optical deflector 5 is described below.

The tilt direction of the flat glass 4 is desirably set so as to cause reflected light of a light beam of which angle of deviation at reflection from the flat glass 4 is largest among light beams to travel toward the installation surface of the optical deflector 5. The tilt angle of the flat glass 4 has already been described. As illustrated in FIGS. 4 and 5, when the tilt direction of the flat glass 4 according to the third embodiment is employed, generation of stray light from a light beam (the writing light b) traveling toward another one of the scanned surfaces 60 than the scanned surface 60 on which a light beam (the writing light a) is can be reduced reliably as described above.

According to the third embodiment, stray light 10c resulting from reflection of the writing light b from the flat glass 4 travels toward the installation surface of the optical deflector 5, by which the stray light is blocked. Accordingly, the stray light does not reach the back side (opposite side) of the optical deflector 5. Optical scanning devices that distribute light beams to opposite sides using the optical deflector 5 such as that illustrated in FIG. 1 are well known. However, when stray light generated on the right side in FIG. 5 is incident on a scanning optical system on the opposite side, or the left side in FIG. 5, the stray light can reach one of the scanned surfaces 60 of the scanning optical system on the opposite side and undesirably degrade image quality.

When a tilt amount of the flat glass 4 is determined according to the first or second embodiment, stray light can reach one of the scanned surfaces 60 on the opposite side depending on the oblique incident angle β employed by the optical system. When the employed oblique incident angle β is large, the stray light is less likely to reach the scanned surface 60; however, when the oblique incident angle β is small, possibility that the stray light reaches the scanned surface 60 is high. Therefore, in order to reliably block stray light generated from light beams on the side of the writing light b, too, it is preferable to set the tilt direction so as to cause reflected light of a light beam of which angle of deviation at reflection from the flat glass 4 is large to travel toward the installation surface of the optical deflector 5.

According to the third embodiment described above, the tilt direction of the flat glass 4 is set so as to cause the flat glass 4 to face the installation surface of the optical deflector 5, thereby preventing generation of stray light or reducing an amount of stray light reaching the scanned surfaces. Hence, image quality can be increased.

Fourth Embodiment

Figure 8:
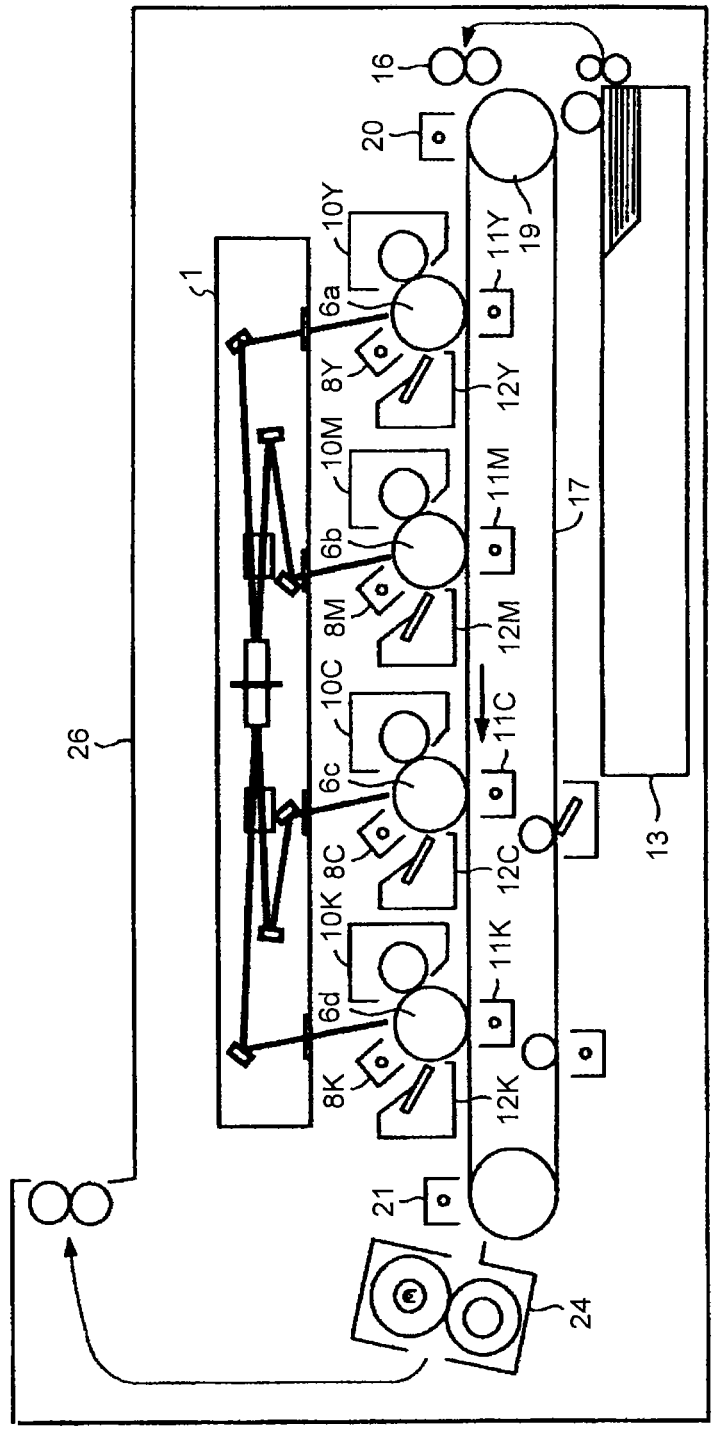
FIG. 8 is a center cross section illustrating an image forming apparatus according to a fourth embodiment of the present invention.

An image forming apparatus according to a fourth embodiment of the present invention is described below with reference to FIG. 8. The fourth embodiment is an example in which the optical scanning device according to the present invention is applied to a tandem full-color laser printer. Referring to FIG. 8, the image forming apparatus includes a conveying belt 17 at a lower portion of the apparatus. The conveying belt 17 conveys transfer paper (not shown) fed from a horizontally-arranged paper cassette 13. A photosensitive element 6a for yellow Y, a photosensitive element 6b for magenta M, a photosensitive element 6c for cyan C, and a photosensitive element 6d for black K are equidistantly arranged along the conveying belt 17 in this order from an upstream side with respect to a conveying direction of the transfer paper.

Each of corresponding reference symbols is followed by the suffix Y, M, C, or K as appropriate for discrimination. The photosensitive elements 6a, 6b, 6c, and 6d are identical in diameter. Process members each of which performs a process of electrophotography processing are arranged in order around each of the photosensitive elements 6a, 6b, 6c, and 6d. The process members are described by way of an example of the photosensitive element 6a. An electric charger 8Y, the optical scanning device 1 according to the embodiments described above, a developing device 10Y, a transfer charger 11Y, a cleaning device 12Y, and the like are arranged in this order. The process members are arranged similarly around each of the other photosensitive elements 6b, 6c, and 6d.

In the fourth embodiment, each of the photosensitive elements 6a, 6b, 6c, and 6d includes the scanned surface 60 (or to-be-illuminated surface) of a corresponding color. The optical scanning device 1 causes an image to be formed on each of the photosensitive elements with corresponding light beams. The optical scanning device 1 performs an opposite-placed scanning method using the single optical deflector 5 and the two scanning lenses L. One of the scanning lenses is shared by M and Y, and the other scanning lens is shared by K and C.

Registration rollers 16 and a belt-electrifying charger 20 are arranged around the conveying belt 17 upstream of the photosensitive element 6a in the conveying direction of the transfer paper. A cleaning device 12K, a belt-separating charger 21, and the like are arranged downstream of the photosensitive element 6d in a rotating direction of the conveying belt 17. A fixing device 24 is arranged downstream of the belt-separating charger 21 in the conveying direction of the transfer paper. Discharging rollers 25 are arranged for sheet delivery from the fixing device 24 to an output tray 26.

When the image forming apparatus configured as described above is in a full-color mode (multiple-color mode) for example, the optical scanning device scans the photosensitive elements 6a, 6b, 6c, and 6d with light beams according to color-image signals for Y, M, C, and K. As a result, electrostatic latent images are formed on the surfaces of the photosensitive elements according to the respective color signals. These electrostatic latent images are developed by the corresponding developing devices using color toners into toner images. The toner images are electrostatically attracted onto the conveying belt 17 and sequentially transferred onto transfer paper to be overlaid on one another. Thus, a full-color image is formed on the transfer paper. This full-color image is fixed by the fixing device 24 and thereafter discharged onto the output tray 26.

According to the fourth embodiment described above, the image forming apparatus includes the optical scanning device 1 described above. Accordingly, generation of stray light is prevented or an amount of stray light reaching the scanned surfaces can be reduced. As a result, image quality can be increased.

The image forming apparatus according to the embodiments described above is a tandem full-color image forming apparatus with four stations. However, the effects described above can be obtained from a tandem image forming apparatus with five or more stations or a monochrome image forming apparatus when the image forming apparatus employs the optical scanning device according to the present embodiment as an optical writing device. The effects described above can be obtained also when the plurality of light sources is what is referred to as a multi-beam semiconductor laser and the optical scanning device according to the present embodiment is employed as an optical writing device.

According to the embodiments, prevention against generation of stray light or reducing stray light reaching a scanned surface can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a plurality of light sources configured to emit a plurality of light beams, respectively;
an optical deflector having a deflection-reflection surface that deflects and reflects the light beams, each of the light beams being incident on the deflection-reflection surface at an oblique incident angle, the oblique incident angles of the light beams being different from one another; and
a flat glass arranged to be tilted at a tilt angle with respect to the deflection-reflection surface in a sub-scanning direction, the light beams being incident on the deflection-reflection surface via the flat glass, the tilt angle being not less than one-half of a largest one of the oblique incident angles of the light beams, wherein
the light beams deflected and reflected by the deflection-reflection surface are incident on a plurality of scanned surfaces via the flat glass, respectively.

2. The optical scanning device according to claim 1, further comprising a plurality of optical elements configured to guide the light beams to the scanned surfaces, wherein
reflected light of a light beam emitted from at least one of the light sources from the flat glass is reflected by the deflection-reflection surface again, and then reaches a portion between adjacent optical elements corresponding respectively to the scanned surfaces of the plurality of optical elements in the sub-scanning direction.

3. The optical scanning device according to claim 2, wherein
the plurality of optical elements includes a scanning lens as an optical element closest to the optical deflector, the scanning lens being shared by the plurality of light beams deflected and reflected by the deflection-reflection surface, and a transmittance of an optical effective portion in the sub-scanning direction of the scanning lens is greater than a transmittance of an optical non-effective portion of the scanning lens.

4. The optical scanning device according to claim 3, wherein a portion of the light beams deflected and reflected by the deflection-reflection surface is blocked at the optical non-effective portion.

5. The optical scanning device according to claim 3, wherein the optical non-effective portion is light-shielded.

6. The optical scanning device according to claim 3, wherein the optical non-effective portion includes an uneven surface that causes diffuse reflection.

7. The optical scanning device according to claim 1, wherein a portion of the light beams deflected and reflected by the deflection-reflection surface and thereafter reflected by the flat glass to be incident on the deflection-reflection surface again is incident on the deflection-reflection surface orthogonal to a spin axis of the optical deflector.

8. The optical scanning device according to claim 1, wherein a tilt direction of the flat glass is set in such a manner that reflected light of a light beam of which angle of deviation at reflection from the flat glass is largest among the light beams travels toward an installation surface of the optical deflector.

9. An image forming apparatus comprising:
an image carrier; and
an optical writing device configured to perform optical writing on the image carrier to form an electrostatic latent image on the image carrier by electrophotography, wherein
the optical writing device includes the optical scanning device according to claim 1.

10. The optical scanning device according to claim 1, wherein the tilt angle of the flat glass in the sub-scanning direction is less than the largest one of the oblique incident angles of the light beams.

11. The optical scanning device according to claim 1, wherein the tilt angle of the flat glass in the sub-scanning direction is three-quarters of the largest one of the oblique incident angles of the light beams.

12. The optical scanning device according to claim 1, wherein the tilt angle of the flat glass in the sub-scanning direction is one-half of the largest one of the oblique incident angles of the light beams.

13. The optical scanning device according to claim 1, wherein the tilt angle of the flat glass in the sub-scanning direction is in a range from one-half to three-quarters of the oblique incident angle.

14. The optical scanning device according to claim 1, wherein the tilt angle of the flat glass in the sub-scanning direction is such that a first stray light beam reflected from the flat glass is horizontally incident on the deflection-reflection surface of the optical deflector and a second stray light beam reflected from the flat glass is not incident on the deflection-reflection surface of the optical deflector.

15. An optical scanning method comprising:
deflecting and reflecting a plurality of light beams by an optical deflector having a deflection-reflection surface so that each of the light beams is incident on the deflection-reflection surface at an oblique incident angle via a flat glass, the light beams being emitted from a plurality of light sources, respectively, the oblique incident angles of the light beams being different from one another, wherein
the flat glass is arranged to be tilted at a tilt angle with respect to the deflection-reflection surface in a sub-scanning direction, the tilt angle being not less than one-half of a largest one of the oblique incident angles of the light beams, and the light beams deflected and reflected by the deflection-reflection surface are incident on a plurality of scanned surfaces via the flat glass, respectively.

* * * * *